(12) United States Patent
Rathineswaran et al.

(10) Patent No.: US 9,843,547 B2
(45) Date of Patent: Dec. 12, 2017

(54) EMAIL BASED PERSISTENT AND SECURE COMMUNICATION SYSTEM FOR INTERACTING WITH DEVICES

(71) Applicant: AMERICAN MEGATRENDS, INC., Norcross, GA (US)

(72) Inventors: Chandrasekar Rathineswaran, Duluth, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 220 days.

(21) Appl. No.: 14/564,646

(22) Filed: Dec. 9, 2014

(65) Prior Publication Data

US 2016/0164817 A1    Jun. 9, 2016

(51) Int. Cl.
| | | |
|---|---|---|
| *G06F 21/00* | (2013.01) | |
| *H04L 12/58* | (2006.01) | |
| *H04L 29/06* | (2006.01) | |
| *G06F 21/62* | (2013.01) | |
| *G06F 21/60* | (2013.01) | |

(52) U.S. Cl.
CPC ............. *H04L 51/18* (2013.01); *G06F 21/60* (2013.01); *G06F 21/629* (2013.01); *H04L 63/0428* (2013.01)

(58) Field of Classification Search
CPC ...... G06F 21/60; G06F 21/602; G06F 21/606; G06F 21/608; G06F 21/629; H04L 9/00
See application file for complete search history.

(56) References Cited

U.S. PATENT DOCUMENTS

| | | | | |
|---|---|---|---|---|
| 2004/0019643 A1* | 1/2004 | Zirnstein, Jr. | ........... | G06F 9/546 709/206 |
| 2004/0174905 A1* | 9/2004 | Caspi | .................. | H04L 12/2803 370/486 |
| 2010/0217806 A1* | 8/2010 | Khot | .................... | G06Q 10/107 709/206 |

* cited by examiner

*Primary Examiner* — Edward Zee
(74) *Attorney, Agent, or Firm* — Locke Lord LLP; Tim Tingkang Xia, Esq.

(57) ABSTRACT

A system includes at least one service device. Each service device has one or more processors, a service email application, and at least one service. The service email application, when executed at the one or more processors of the service device, is configured to retrieve a command email containing at least one command and having an email identifier associated with the service, extract the command from the command email, and send the extracted command to the service such that the service performs a corresponding function based on the extracted first command.

10 Claims, 7 Drawing Sheets

EMAIL BASED PERSISTENT AND SECURE COMMUNICATION SYSTEM FOR INTERACTING WITH DEVICES

FIELD

The present disclosure relates generally to interacting with devices, and particularly to a system and method of interacting with devices through email.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user can control a device through an interface of the device onsite. When the user is offsite, the offsite user can also remotely control the device by logging-in to the interface of the device and performing certain services. However, the remotely control of the device may not be convenient for the user, and to allow remote control for the user, a remote connection to the device must be established, which bring security concerns. Further, the remote control of the device is real time, and the reliability of the remote connection is critical. When the remote connection is lost, the remote control is interrupted. Thus, the remote control of the device lacks the flexibility of performing certain function at a later time.

Therefore, an unaddressed need exists in the art to address the aforementioned deficiencies and inadequacies.

SUMMARY

In one aspect, the present disclosure relates to a system. The system includes at least one first service device, each first service device has one or more processors, a service email application, and at least one first service. The service email application, when executed at the one or more processors of the at least one first service device, is configured to:

retrieve a command email, wherein the command email comprises at least one first command and has an email identifier associated with the at least one first service;

extract the at least one first command from the command email; and send the extracted first command to the at least one first service such that the at least one first service performs a corresponding first function based on the extracted first command.

In one embodiment, the service email application retrieves the command email from at least one email server via a network.

In one embodiment, the service email application, when executed, is further configured to:

verify the command email based on the email identifier of the command email;

decrypt the command email;

receive a result from the at least one service performing the first function;

generate an result email comprising the result, wherein the result email is subject to be sent to a target device;

encrypt the result email; and send the encrypted result email to the at least one email server such that the target device is capable of retrieving the encrypted result email from the at least one email server.

In one embodiment, the result includes at least one second command, and the target device is a second service device having a second service, such that the second service performs a corresponding second function based on the second command.

In one embodiment, the service email application includes:

an address verification module, configured to verify the command email based on the email identifier of the command email;

an encryption/decryption module, configured to encrypt the result email and decrypt the command email;

a command processing module, configured to extract the at least one first command from the command email and send the extracted first command to the at least one first service such that the at least one first service performs the corresponding first function based on the extracted first command; and a service email processing module, configured to retrieve the command email, receive the result, generate the result email, and send the encrypted result email.

In one embodiment, the system further includes at least one user device. Each user device has one or more processors and a user email application. The user email application, when executed at the one or more processors of the user device, is configured to:

provide a user interface configured to receive the at least one command;

prepare the command email;

encrypt the command email;

send the command email;

retrieve the encrypted result email;

decrypt the encrypted result email to form a decrypted result email; and retrieve the result from the decrypted result email.

In one embodiment, the user email application includes:

a user interface module, configured to provide the user interface;

an encryption/decryption module, configured to encrypt the command email and decrypt the encrypted result email; and a user email processing module, configured to prepare the command email, send the command email, retrieve the encrypted result email, and retrieve the result from the decrypted result email.

In one embodiment, the at least one first service includes management of IPMI, or management of combined SNMP and shell functions.

In another aspect, the present disclosure relates to a method of performing email based interaction in a system. The method includes:

retrieving, at a service email application executed at one or more processors of a first service device, a command email, wherein the command email comprises at least one first command and has an email identifier associated with at least one first service of the service device;

extracting, at the service email application, the at least one first command from the command email; and sending, by the service email application, the extracted first command to the at least one first service such that the at least one first service performs a corresponding first function based on the extracted first command.

In one embodiment, the method further includes:

verifying, at the service email application, the command email based on the email identifier of the command email;

decrypting the command email;

receiving a result from the at least one service performing the first function;

generating an result email comprising the result, wherein the result email is subject to be sent to a target device;

encrypting the result email; and sending the encrypted result email to at least one email server such that the target device is capable of retrieving the encrypted result email from the at least one email server.

In one embodiment, the result includes at least one second command, and the target device is a second service device having a second service, such that the second service performs a corresponding second function based on the second command.

In one embodiment, the service email application includes:

an address verification module, configured to verify the command email based on the email identifier of the command email;

an encryption/decryption module, configured to encrypt the result email and decrypt the command email;

a command processing module, configured to extract the at least one first command from the command email and send the extracted first command to the at least one first service such that the at least one first service performs the corresponding first function based on the extracted first command; and a service email processing module, configured to retrieve the command email, receive the result, generate the result email and send the encrypted result email.

In one embodiment, the system further includes at least one user device. Each user device has one or more processors and a user email application. The user email application, when executed at the one or more processors of the user device, is configured to:

provide a user interface configured to receive the at least one command;

prepare the command email;

encrypt the command email;

send the command email;

retrieve the encrypted result email decrypt the encrypted result email to form a decrypted result email; and retrieve the result from the decrypted result email.

In one embodiment, the user email application includes:

a user interface module, configured to provide the user interface;

an encryption/decryption module, configured to encrypt the command email and decrypt the encrypted result email; and a user email processing module, configured to prepare the command email, send the command email, retrieve the encrypted result email, and retrieve the result from the decrypted result email.

In a further aspect, the present disclosure relates to a non-transitory computer readable medium storing computer executable code. The code, when executed at one or more processors of a first service device, is configured to:

retrieve a command email, wherein the command email comprises at least one first command and has an email identifier associated with at least one first service of the first service device;

extract the at least one command from the command email; and send the extracted first command to the at least one first service such that the at least one first service performs a corresponding first function based on the extracted first command.

In one embodiment, the code, when executed at the one or more processors of the first service device, is further configured to:

verify the command email based on the email identifier of the command email;

decrypt the command email;

receive a result from the at least one service performing the first function;

generate an result email comprising the first result, wherein the result email is subject to be sent to a target device;

encrypt the result email; and send the encrypted result email to at least one email server such that the target device is capable of retrieving the encrypted result email from the at least one email server.

In one embodiment, the result includes at least one second command, and the target device is a second service device having a second service, such that the second service performs a corresponding second function based on the second command.

In one embodiment, the code includes:

an address verification module, configured to verify the command email based on the email identifier of the command email;

an encryption/decryption module, configured to encrypt the result email and decrypt the command email;

a command processing module, configured to extract the at least one first command from the command email and send the extracted first command to the at least one first service such that the at least one first service performs the corresponding first function based on the extracted command; and a service email processing module, configured to retrieve the command email, receive the result, generate the result email and send the encrypted result email.

In one embodiment, the first service device is remotely connected to at least one user device through a network. Each user device has one or more processors and a user email application. The user email application, when executed at the one or more processors of the user device, is configured to:

provide a user interface configured to receive the at least one command;

prepare the command email;

encrypt the command email;

send the command email;

retrieve the encrypted result email;

decrypt the encrypted result email to form a decrypted result email; and retrieve the result from the decrypted result email.

In one embodiment, the user email application includes:

a user interface module, configure to provide the user interface;

an encryption/decryption module, configured to encrypt the command email and decrypt the encrypted result email; and a user email processing module, configured to prepare the command email, send the command email, retrieve the encrypted result email, and retrieve the result from the decrypted result email.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings.

DETAILED DESCRIPTION

Figure 1A:
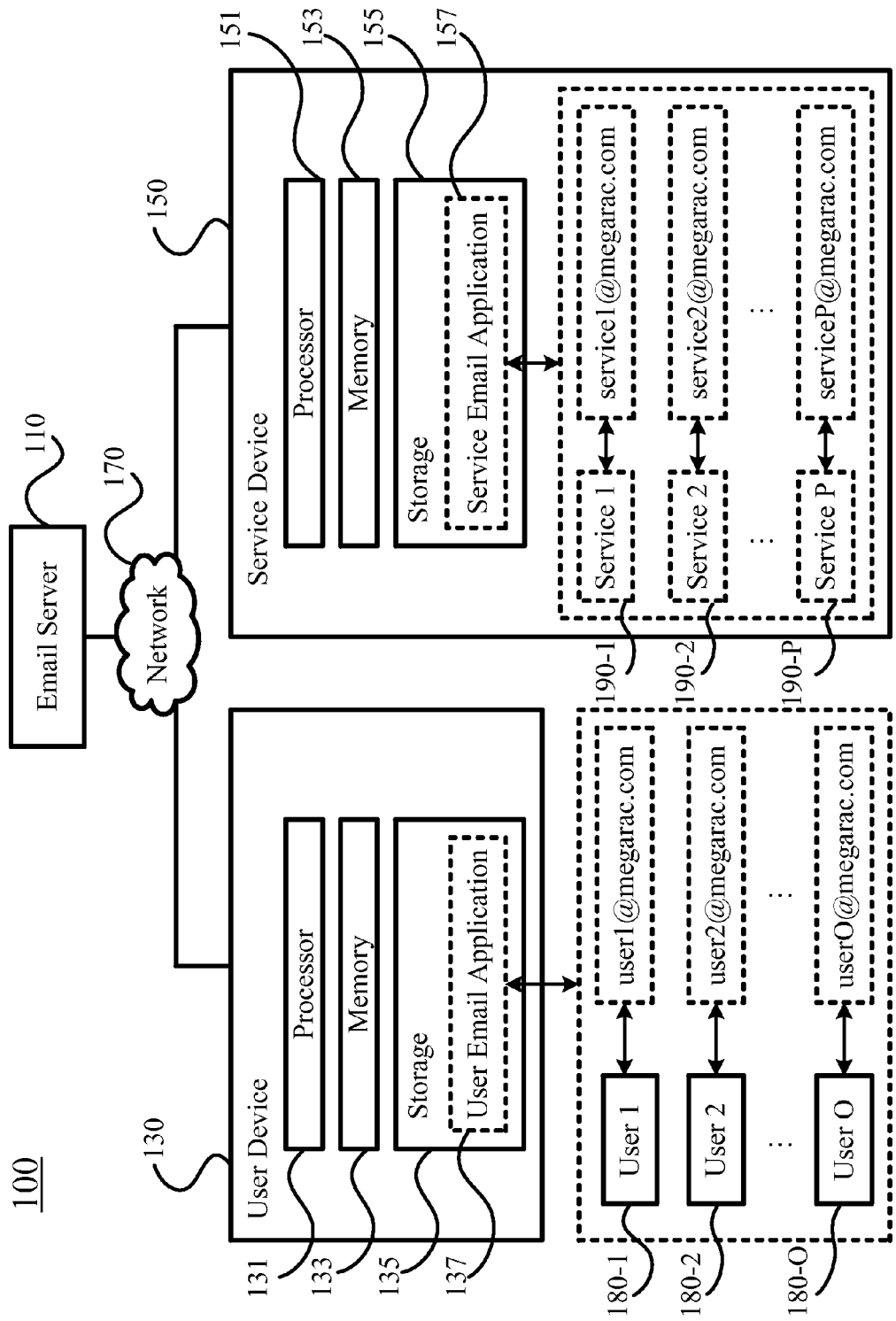
FIG. 1A schematically depicts a system for interacting with devices based on email according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

As used herein, the term "headless system" or "headless machine" generally refers to the computer system or machine that has been configured to operate without a monitor (the missing "head"), keyboard, and mouse.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

In one aspect, the present disclosure is related to a system of email based persistent and secure communication channel for interacting with devices.

FIG. 1A schematically depicts a system for interacting with devices based on email according to certain embodiments of the present disclosure. As shown in FIG. 1A, the system 100 includes an email server 110, a user device 130 and a service device 150. The user device 130 and the service device 150 are in communication with the email server 110, for example, through a network 170. The network 170 may be a wired or wireless network, and may be of various forms such as a local area network (LAN) or wide area network (WAN) including, but not limited, to an intranet, an extranet, an internetwork, an Internet, a darknet, or any other network that allows for information communication, especially for email data transmission.

Figure 1B:
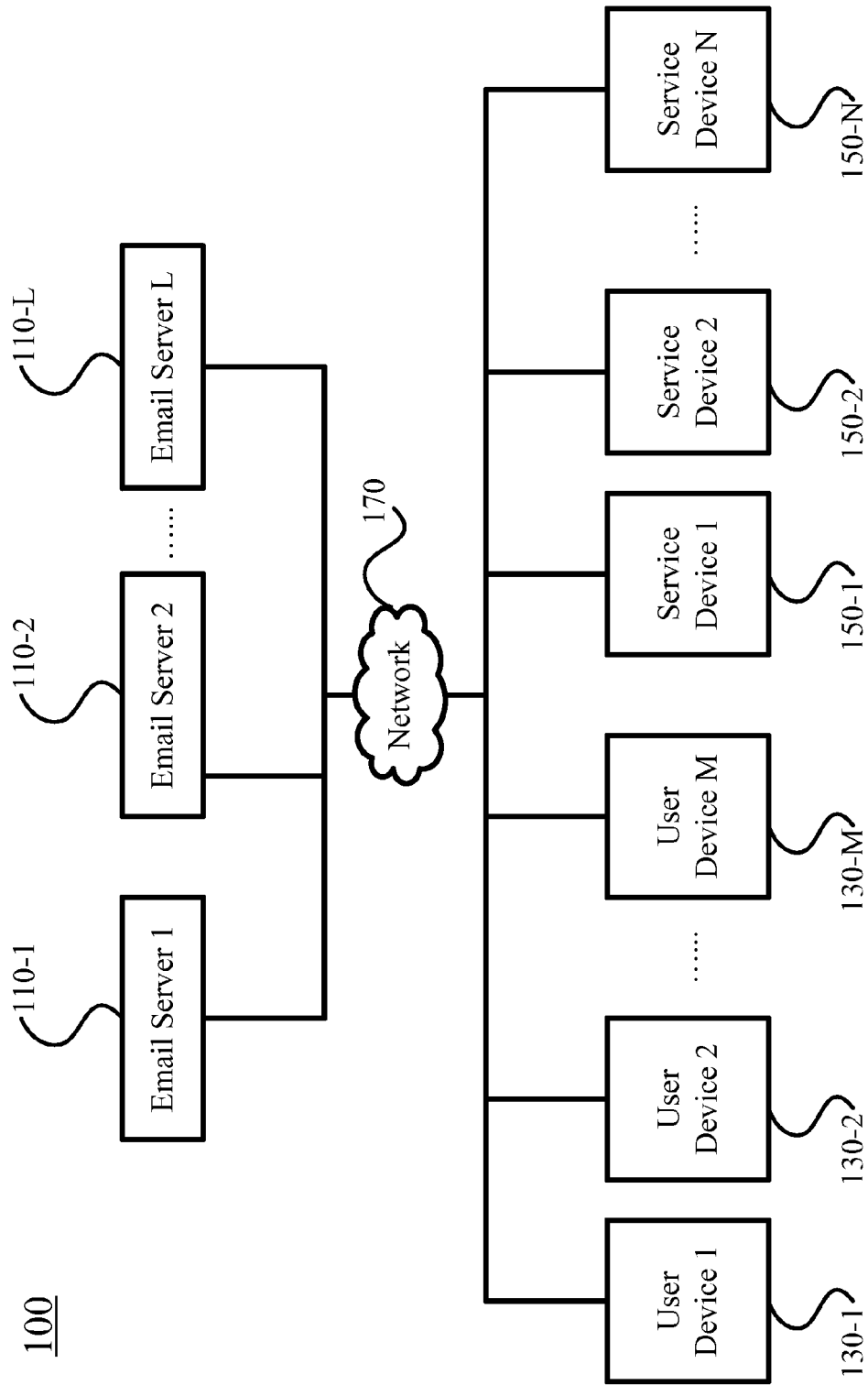
FIG. 1B schematically depicts a system for interacting with devices based on email according to certain embodiments of the present disclosure.

In certain embodiments, the system 100 may include two or more email servers 110, two or more user devices 130, and/or two or more service devices 150. FIG. 1B schematically depicts a system for interacting with devices based on email according to certain embodiments of the present disclosure, where the system 100 may include a plurality of email servers 110-1 to 110-L, a plurality of user devices 130-1 to 130-M, and a plurality of service devices 150-1 to 150-N, where L, M and N are positive integers. In other words, L email servers 110, M user devices 130 and N service devices 150 are provided in the system 100 as shown in FIG. 1B. It should be noted that the positive integers L, M and N may be independently determined. For example, L, M and N may be equal to one another, or may be three different positive integers. In other words, in the system 100, the number L of email servers 110, the number M of user devices 130, and the number N of service devices 150 may be determined independently from one another. It is also possible to add any number of email servers 110, user devices 130, and/or service devices 150 to the system 100. Each of the user devices 150 and each of the service devices 150 may communicate with each other through the email servers 110 by sending and receiving emails. In certain embodiments, one of the service devices 150 may also send emails to another service device 150.

The email server 110 may be one server (or, as shown in FIG. 1B, a plurality of servers) for providing email services to both the user device 130 and the service device 150. For example, the user device 130 and the service device 150 may be located under the same domain and use the same email server 110 for incoming and outgoing emails. In certain embodiments, the system 100 may include one email server 110 as shown in FIG. 1A, and the user device 130 and the service device 150 may be in communication with the email server 110. In certain embodiments, the system 100 may include a plurality of email servers 110 as shown in FIG. 1B, and the user device 130 and the service device 150 may be in communication with different email servers 110. In this case, the different email servers 110 may communicate with each other directly, or through other email servers, for example, via the network 170. In certain embodiments, the email server 110 may include incoming and/or outgoing email services. For example, the email server 110 may include both a Post Office Protocol 3/Internet Message Access Protocol (POP3/IMAP) module for incoming email service, and a Simple Mail Transfer Protocol (SMTP) module for outgoing email service. In certain embodiments, when the system 100 includes multiple email servers 110, one email server 110 may include only a POP3/IMAP module for incoming email service, and the other email server 110 may include only a SMTP module for outgoing email service.

The user device 130 may be a computing device, such as a general purpose computer or a headless computer. In certain embodiments, the user device 130 may be a personal computer, a personal digital assistant (PDA), a mobile device, or any other devices that may be used for email services. In certain embodiments, the user device 130 may be a system on chip (SoC). As shown in FIG. 1A, the user device 130 has a processor 131, a memory 133, a storage device 135, and any other necessary hardware components enabling the user device 130 to operate. In certain embodiments, the system 100 may include a plurality of user devices 130, as shown in FIG. 1B.

The processor 131 is configured to control operation of the user device 130. The processor 131 may execute an operation system or other applications of the storage 135. In certain embodiments, the storage 135 may run on more than one processor, such as two processors, four processors, eight processors, or any suitable number of processors.

The memory 133 may be a volatile memory, such as the random-access memory (RAM), for storing the data and information during the operation of the user device 130.

The storage 135 is a non-volatile data storage media for storing an operating system (OS) (not shown), a user email application 137, and other applications of the user device 130. The storage 135 may store the OS, the user email application 137, and any other necessary software or firmware components executable at the processor 131. In certain embodiments, the OS, the user email application 137, and any other necessary software or firmware components may be implemented as computer executable codes.

The user email application 137 may be an email client application for one or more users to process with emails, such as receiving and/or sending emails. As shown in FIG. 1A, the user email application 137 is stored in the storage 135. Examples of the user email application 137 may include but not limited to Microsoft Outlook, Mozilla's Thunderbird, Apple Inc.'s Mail, etc. In certain embodiments, the user email application 137 may be a part of the operating system (OS) of the user device 130 or a part of the firmware of the user device 130. In certain embodiments, the user email application 137 may be a web application, such as a web browser connected to a web-based email website. Examples of the web-based email website may include but not limited to Gmail or Yahoo! Mail. In certain embodiments, the user email application 137 may be a customized email application specialized for the system 100. In certain embodiments, the user device 130 may include two or more different user email applications 137, where each of the two or more user email applications 137 may be used to process with emails.

As described above, the user email application 137 may be reached by one or more users, such as user 1 to user O as shown in FIG. 1A, where O is a positive integer. Each of the users may have a specific email identifier. In certain embodiments, the specific email identifier may be a specific email address of the user 180. For example, each of the users 180-1, 180-2, . . . 180-O may have a specific email address of user1@megarac.com, user2@megarac.com, . . . userO@megarac.com.

Figure 2:
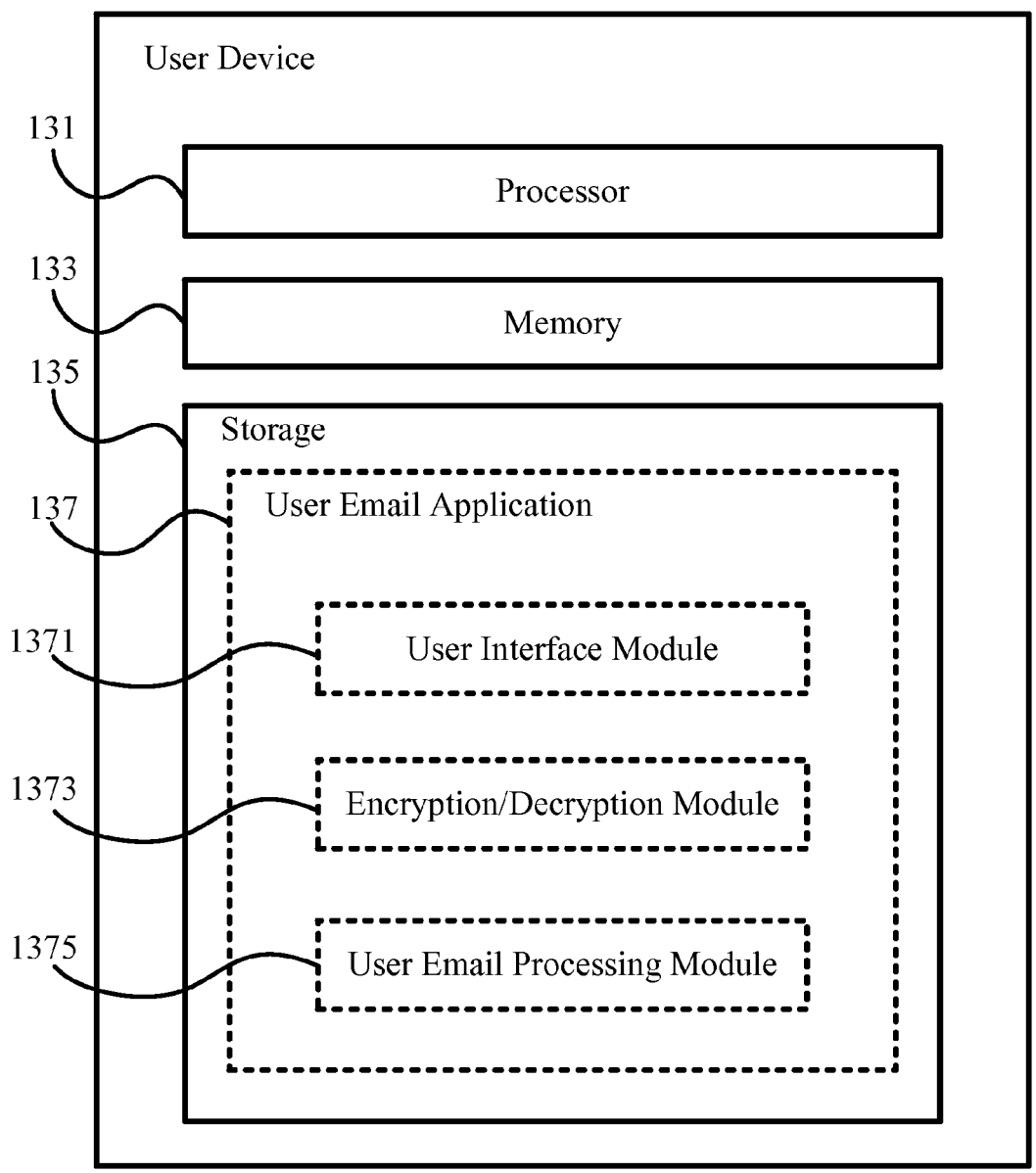
FIG. 2 schematically depicts a structure of a user device according to certain embodiments of the present disclosure.

FIG. 2 schematically depicts a structure of a user device 130 according to certain embodiments of the present disclosure, in which details of the user email application 137 is illustrated. As shown in FIG. 2, the user email application 137 includes a user interface module 1371, an encryption/decryption module 1373, and a user email processing module 1375.

The user interface module 1371 provides a user interface available to a user such that the user may compose an email, and perform operations such as sending or retrieving one or more emails, through the user interface module 1371. For example, the email may be the command email. In other words, the user may input at least one command through the user interface, such that the user email processing module 1375 of the user email application 137 may prepare the command email based on the at least one command received through the user interface. In certain embodiments, the user interface module 1371 may include a graphical user interface. When the user email application 137 is executed, the user interface module 1371 displays the graphical user interface on a display device (not shown) of the user device 130 such that the user may perform operation to the emails through the graphical user interface. In certain embodiments, the user interface module 1371 may include other types of user interface, such as a text-based interface, a voice operated interface, etc.

The encryption/decryption module 1373 is configured to encrypt a composed email before sending it out, or decrypt a retrieved email from the one or more email servers 110, such that the decrypted content of the email may be viewable by the user through the user interface module 1371. In certain embodiments, the composed email may be the command email, and the retrieved email may be an encrypted result email. For example, the encryption/decryption module 1373 may include one or more algorithms for encryption/decryption. When the user email processing module 1375 has composed a command email, the user email processing module 1375 may send the composed command email to the encryption/decryption module 1373 for encryption. The encryption/decryption module 1373 encrypts the composed command email, and then sends the encrypted command email to the user email processing module 1375 for further processing. In certain embodiment, when the user email processing module 1375 retrieves an encrypted result email, the user email processing module 1375 may send the retrieved encrypted result email to the encryption/decryption module 1373 for decryption. The encryption/decryption module 1373 decrypts the encrypted result email to form a decrypted result email, and then sends the decrypted result email to the user email processing module 1375 for further processing. In certain embodiments, the encryption of the command email and the decryption of the result email use the same algorithm, thus are reverse processes. In certain embodiments, the result email is not required.

The user email processing module 1375 is configured to prepare one or more emails based on the user input received by the user interface, send the prepared one or more emails to the one or more email servers 110, retrieve one or more emails from the one or more email servers 110, and/or retrieve contents of the one or more emails for the user interface to show the contents to the user. For example, when the user inputs the command email content through the user interface, and inputs a command to send the command email (such as clicking a "send" button on the graphical user interface), the user interface module 1371 sends the content to the user email processing module 1375 such that the content is processed by the user email processing module 1375 to add corresponding information that is recognizable by the email server 110 to prepare or form the command email. Once the command email is prepared, the user email processing module 1375 sends the command email to the email server 110. When encryption is required, the user email processing module 1375 may send the command email to the encryption/decryption module 1373 for encryption before sending the command email to the email server 110. After receiving the encrypted command email from the encryption/decryption module 1373, the user email processing module 1375 then sends the encrypted command email to the email server 110. In certain embodiments, the user email processing module 1375 may retrieve emails from the email server 110 following one or more predetermined rules. For example, the user email processing module 1375 may retrieve emails when the user email application 137 launches, or at certain time intervals when the user email application 137 is running, or when the user inputs a command to retrieve the emails from the email server (such as clicking on a "receive" or "update" button on the graphical interface). When decryption is required, the user email processing module 1375 may send the retrieved emails to the encryption/decryption module 1373 for decryption before further processing the decrypted emails. For example, when the user email processing module 1375 retrieves the encrypted result email from the email server 110, the user email processing module 1375 sends the encrypted result email to the encryption/decryption module 1373 for decryption, receives the decrypted result email from the encryption/decryption module 1373, and processes the decrypted result email to retrieve the result from the decrypted result email such that the result is viewable for the user through the user interface. In certain embodiments, when the result email retrieved from the email server 110 is not encrypted, the user email processing module 1375 may process the result email directly to retrieve the result such that the result is viewable for the user through the user interface.

The service device 150 may be a computing device, such as a server computer, general purpose computer or a headless computer. In certain embodiments, the service device 150 may be a computer cluster, a cloud storage server, a web server, or any other devices that may be configured to have email services. In certain embodiments, the service device 150 may be an SoC. As shown in FIG. 1A, the service device 150 has a processor 151, a memory 153, a storage 155, and any other necessary hardware components enabling the service device 150 to operate. In certain embodiments, the system 100 may include a plurality of service devices 150, as shown in FIG. 1B.

The processor 151 is configured to control operation of the service device 150. The processor 151 may execute an operation system or other applications of the storage 155. In certain embodiments, the storage 155 may run on more than one processor, such as two processors, four processors, eight processors, or any suitable number of processors.

The memory 153 may be a volatile memory, such as the RAM, for storing the data and information during the operation of the service device 150.

The storage 155 is a non-volatile data storage media for storing an OS (not shown), a service email application 157, and other applications of the service device 150. The storage 155 may store the OS, the service email application 157, and any other necessary software or firmware components executable at the processor 151. In certain embodiments, the OS, the service email application 157, and any other necessary software or firmware components may be implemented as computer executable codes.

The service email application 157 may be an email client application for one or more services to process with emails, such as receiving and/or sending emails. As shown in FIG. 1A, the service email application 157 is stored in the storage 155. Examples of the service email application 157 may include but not limited to Microsoft Outlook, Mozilla's Thunderbird, Apple Inc.'s Mail, etc. that may be customized for the services. In certain embodiments, the service email application 157 may be a part of the OS of the service device 150 or a part of the firmware of the service device 150. In certain embodiments, the service email application 157 may be a web application, such as a web browser connected to a web-based email website that is customized for the services. Examples of the web-based email website may include but not limited to Gmail or Yahoo! Mail. In certain embodiments, the service email application 157 may be a completely customized email application specialized for the system 100. In certain embodiments, the service device 150 may include two or more different service email applications 157, where each of the two or more service email applications 157 may be used to process with emails.

As described above, the service email application 157 may be reached by one or more services, such as service 1 to service P as shown in FIG. 1A, where P is a positive integer. Each of the services may have a specific email identifier. In certain embodiments, the specific email identifier may be a specific email address of the service 190. For example, each of the services 190-1, 190-2, . . . 190-P may have a specific email address of service1@megarac.com, service2@megarac.com, . . . serviceP@megarac.com. It should be noted that the positive integer P is unrelated to the positive integer O. In other words, the total number P of the services 190 at the service device 150 is independent and unrelated to the total number O of the users 180 at the user device 130.

Figure 3:
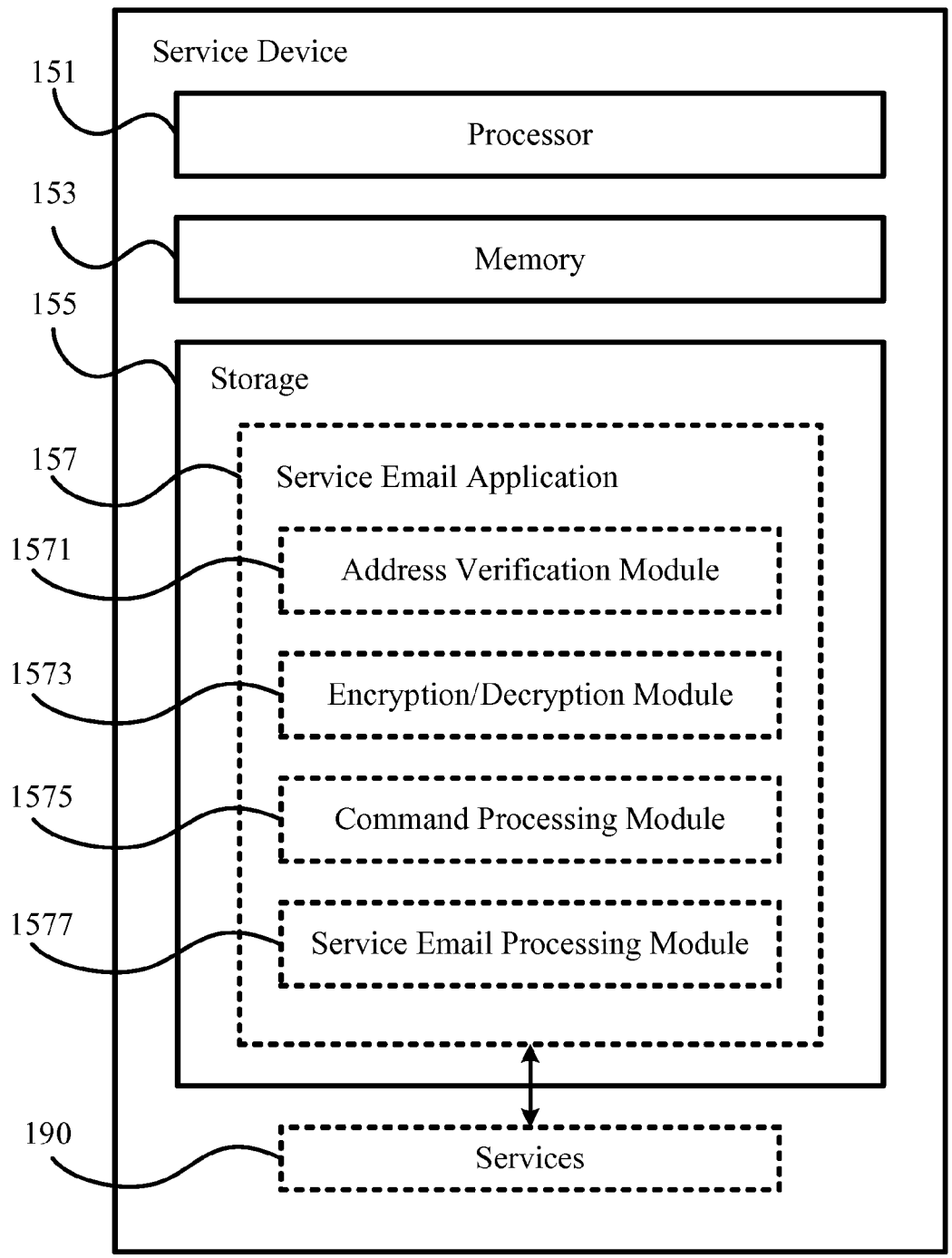
FIG. 3 schematically depicts a structure of a service device according to certain embodiments of the present disclosure.

FIG. 3 schematically depicts a structure of a service device 150 according to certain embodiments of the present disclosure, in which details of the service email application 157 is illustrated. As shown in FIG. 3, the service email application 157 includes an address verification module 1571, an encryption/decryption module 1573, a command processing module 1575, and a service email processing module 1577.

The address verification module 1571 provides a security check for the emails retrieved by the service device 150. For example, the email may be the command email. When the service device 150 retrieves the command email from the email server 110, the address verification module 1571 may verify the features of the command email, such as the email identifier. If the email identifier is verified as valid, the address verification module 1571 sends the positive verification result to the service email processing module 1577, and the service email processing module 1577 may then send the command email to the encryption/decryption module 1573 for decryption. If the email identifier is determined as invalid, the address verification module 1571 sends the negative verification result to the service email processing module 1577, and the service email processing module 1577 may then discard the command email. In certain embodiments, the service device 150 may have a database, a file or a list that the address verification module 1571 may use to compare with the email identifier of the retrieved command email.

The encryption/decryption module 1573 is configured to encrypt a composed email before sending it out, or decrypt a retrieved email from the one or more email servers 110, such that the decrypted email may be processed by the command processing module 1575. In certain embodiments, the composed email may be the result email, and the retrieved email may be the command email. In certain embodiments, the encryption/decryption module 1373 of the user email application 137 and the encryption/decryption module 1533 of the service email application 157 may use the same set of encryption algorithm such that an email encrypted by the encryption/decryption module 1373 may be decrypted by the encryption/decryption module 1573, and an email encrypted by the encryption/decryption module 1573 may be decrypted by the encryption/decryption module 1373. When the command email has been verified by the address verification module 1571, the service email processing module 1577 sends the verified command email to the encryption/decryption module 1573 for decryption. The encryption/decryption module 1573 then decrypts the command email, and sends the decrypted command email to the service email processing module or to the command processing module. In certain embodiments, if the verified email is not encrypted, the service email processing module 1577 may send the un-encrypted command email directly to the command processing module 1575.

The command processing module 1575 is configured to extract at least one command from the decrypted or un-encrypted command email, and send the at least one command to at least one corresponding service 190, such that the at least one service 190 performs a corresponding function based on the extracted at least one command. For example, when the service email application 157 is executed, the service email processing module 1577 or optionally the encryption/decryption module 1573 sends the command email to the command processing module 1575, the command processing module 1575 extracts the at least one command from the command email, and then sends the extracted at least one command to the at least one of the services 190. Once the at least one service 190 receives the at least one command, the at least one service 190 performs a corresponding function based on the extracted command. The at least one command may be one command or a set of commands associated with the corresponding service 190. The at least one command, for example, may be stored in the title of the email or preferably in the body of the email. By storing the one or the set of commands in the body of the email and encrypting the email, among other things, the system may have high security to protect the commands from being intercepted, and may have high capacity such that a large number of commands may be sent through one email.

Each of the services 190 is configured to perform associated functions. In certain embodiments, one service 190 may performs management of intelligent platform management interface (IPMI), the other service 190 may perform management of combined simple network management protocol (SNMP) and shell functions. When the at least one command is a set of commands, the service 190 may perform the set of commands in parallel or in serial corresponding to, for example the parameters related to the set of commands. The parameters may be inputted by the user during preparation of the command email, and maintained with the command through the whole process.

After the service 190 performs the function corresponding to the at least one command, the service 190 may generates a result, and send the result to the service email processing module 1577. The result may include the information of whether the function is performed successfully. In certain embodiments, the result may include another one or a set of commands associated to another service of another service device The service email processing module 1577 is configured to retrieve one or more emails from the one or more email servers 110, receive the result from the service 190, generate one or more emails based on the result, send the one or more generated emails to the encryption/decryption module for encryption, and send the encrypted one or more emails to the one or more email servers 110. In certain embodiments, the generated email may the result email, and the retrieved email may be the encrypted command email. For example, when the service email application 157 is executed, the service email processing module 1577 may retrieve emails from the email server 110 following one or more predetermined rules. For example, the service email processing module 1375 may retrieve emails when the service email application 157 launches, or at certain time intervals when the service email application 157 is running Once the email is retrieved, the service email processing module 1577 may send the email or optionally the email identifier of the retrieved email to the address verification module 1571 for verification, and after verification, the address verification module 1571 sends the verified email or optionally the verification result to the service email processing module 1577. Upon receiving the verified email or the positive verification result, the service email processing module 1577 may send the verified email to the encryption/decryption module 1573 for decryption. When the service 190 sends a result to the service email processing module 1577, the service email processing module 1577 may add corresponding information that is recognizable by the email server 110 to generate the result email. Once the result email is generated, the service email processing module 1577 sends the result email to the email server 110. When encryption is required, the service email processing module 1577 may send the result email to the encryption/decryption module 1573 for encryption before sending out to the email server 110. After receiving the encrypted result email from the encryption/decryption module 1573, the service email processing module 1577 then sends the encrypted result email to the email server 110. In certain embodiments, when the result is whether the function is accomplished successfully or not, the service email processing module 1577 may send the result email to the sender/user of the command email, such that the result of the service is viewable by the user through the user interface of the user interface module 1371. When the result is another one or a set of commands, the service email processing module 1577 may send the result email containing those commands to another service device having another service email application, such that the service of the another service device may perform certain functions according to the command/commands stored in the result email. The email server 110 used for retrieving a command email and for sending a result email may or may not be the same email server.

In another aspect, the present disclosure is related to a method of email based persistent and secure communication channel for interacting with devices.

Figure 4A:
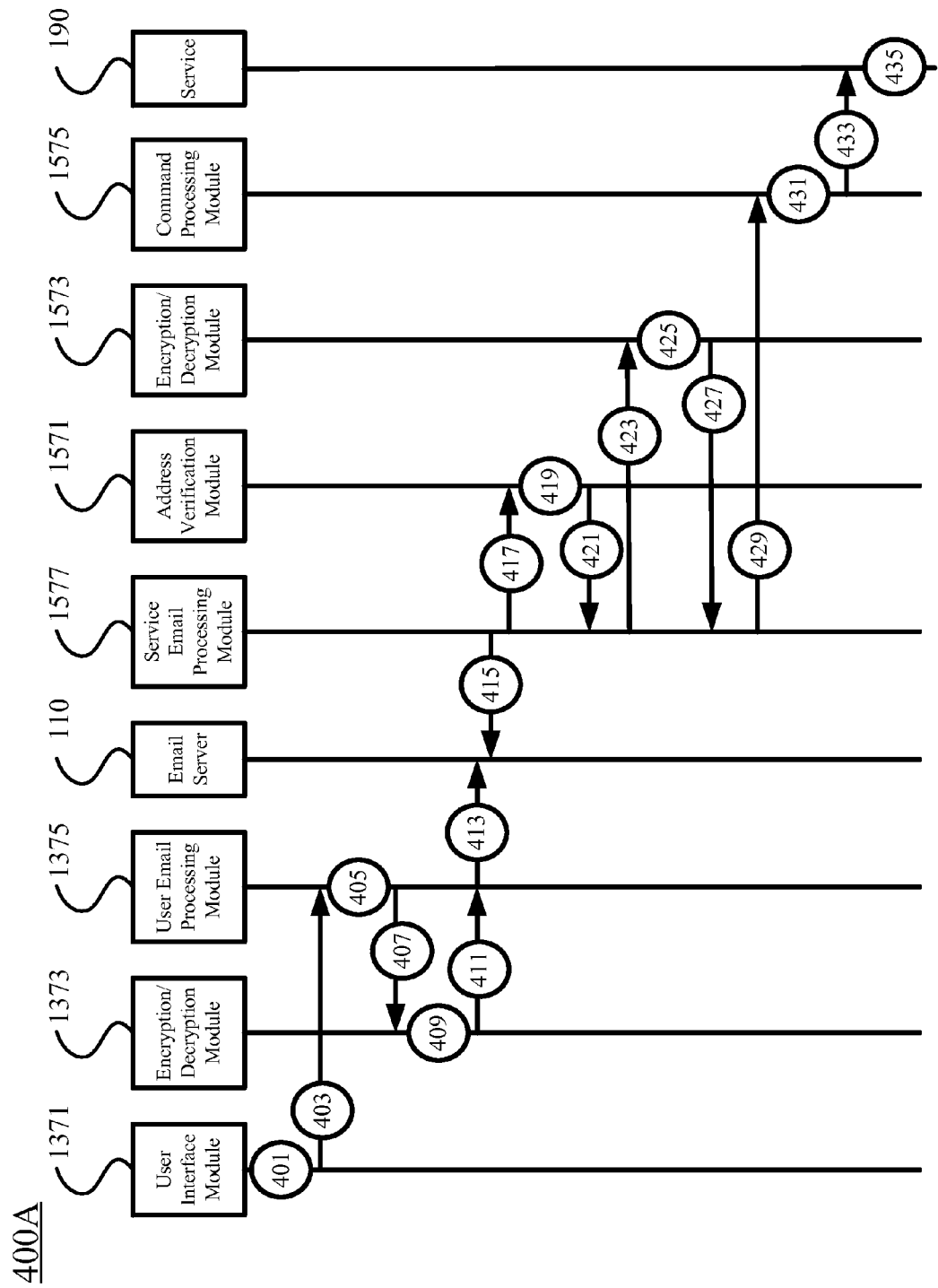
FIG. 4A schematically depicts a method of interacting with devices based on email according to certain embodiments of the present disclosure.

FIG. 4A schematically depicts a method of interacting with devices based on email according to certain embodiments of the present disclosure. In certain embodiments, the method 400A as described in FIG. 4A may be implemented by the system 100 as shown in FIGS. 1A and 1B.

Referring to FIG. 4A, when the user intends to perform a function to the service device 150, at operation 401, the user inputs, through the user interface provided by the user interface module 1371, an email identifier corresponding to the service on the service device 150 to perform the function, and a content including at least one command, and the user interface module 1371 receives the email identifier and the content. In certain embodiments, the email identifier may be an email address designated for the service on the service device 150 to perform the function.

At operation 403, when the user interface module 1371 receives a command input by the user to send the email, the user interface module 1371 sends the input (the email identifier and the content) by the user to the user email processing module 1375. For example, when the user finishes inputting the at least one first command as the content of the email, and clicks a "send" button of the user interface provided by the user interface module 1371, the user interface module 1371 sends the input by the user to the user email processing module 1375.

Upon receiving the input from the user interface module 1371, at operation 405, the user email processing module 1375 prepares a command email according to the input by the user.

Optionally, in certain embodiments, the command email or the command in the command email is encrypted. When the command email requires encryption, at operation 407, the user email processing module 1375 sends the command email to the encryption/decryption module 1373. At operation 409, the encryption/decryption module 1373 performs encryption to the command email to form the encrypted command email. When the encryption is complete, at operation 411, the encryption/decryption module 1373 sends the encrypted command email to the user email processing module 1375.

Once the command email is prepared and ready to be sent to the service device, at operation 413, the user email processing module 1375 sends the command email to the email server 110.

In certain embodiments, when the command email does not require encryption, the user email processing module 1375 may skip the operations 407-411 and directly perform the operation 413 to send the command email to the email server 110.

At the email server 110, the command email may be stored in the email server 110 until the service email application 157 retrieves the command email. Thus, the at least one first command in the command email may be preserved at the email server 110 regardless of the operational status of the user device 130 and/or the service device 150. For example, when an error occurs in the service device 150 such that the service device 150 is disconnected from the network 170, the command email may be preserved at the email server 110 without being under the risk of losing the at least one first command therein. Accordingly, the method provides a persistent communication way for the first command to be delivered from the user device 130 to the service device 150, thus avoiding loss of commands in a real time process.

At operation 415, the service email processing module 1577 of the service email application 157 of the service device 150 retrieves the encrypted command email from the email server 110. In certain embodiments, both the user email processing module 1375 and the service email processing module 1577 may use the same email server 110.

In certain embodiments, the user email processing module 1375 may use one email server, the service email processing module 1577 may use another email server, and the two email servers may be in communication directly or through one or more other email servers in the network 170.

At operation 417, the service email processing module 1577 sends the retrieved command email to the address verification module 1571 for verification.

At operation 419, the address verification module 1571 performs verification on the retrieved command email. In certain embodiment, the address verification module 1571 may verify the retrieved command email based on the email identifier. For example, the address verification module 1571 may verify if the email identifier is valid for further processing. In certain embodiments, the verification may include, but not limited to, comparing the email identifier of the retrieved command email with an email identifier list, a file having the list, or a database having the email identifier list. The valid email identifier may include email addresses of certain users. In other embodiments, the valid email identifier may include email addresses having the same domain name.

When the address verification module 1571 determines that the retrieved command email is a valid command email, at operation 421, the address verification module 1571 sends the verified command email to the service email processing module 1577 for further processing. When the address verification module 1571 determines that the retrieved command email is not a valid command email, the address verification module 1571 may perform corresponding caution operation to the invalid email, such as discarding the invalid email.

Optionally, when the command email is encrypted, at operation 423, the service email processing module 1577 sends the command email to the encryption/decryption module 1573 for decryption. At operation 425, the encryption/decryption module 1573 performs decryption to the command email to form the decrypted command email. When the decryption is complete, at operation 427, the encryption/decryption module 1573 sends the decrypted command email to the service email processing module 1577.

Upon receiving the decrypted command email, at operation 429, the service email processing module 1577 sends the decrypted command email to the command processing module 1575.

In certain embodiments, if the verified command email is not encrypted, the service email processing module 1577 may skip the operations 423-427 and sends the verified email to the command processing module 1575 directly. In certain embodiments, the service email processing module 1577 may perform operation 423 to send the verified command email to the encryption/decryption module 1573 regardless of whether the command email is encrypted or not. In this case, if the encryption/decryption module 1573 receives an un-encrypted command email, the encryption/decryption module 1573 does nothing at operation 425 to the command email, and performs operation 427 to send the un-encrypted command email to the service email processing module 1577 or optionally to the command processing module 1575.

When the command processing module 1575 receives the decrypted command email, at operation 431, the command processing module 1575 extracts the at least one command from the command email. The at least one command may be associated with at least one service 190.

At operation 433, the command processing module 1575 sends the extracted at least one command to the service 190.

At operation 435, the corresponding service then performs a function based on the extracted at least one command.

In certain embodiments, the service 190 performing the function generates a result based on the performance of the function. In certain embodiments, the result may include information of whether the function is performed successfully or not. In certain embodiments, the result may include one or more commands associated with another service of another service device.

Figure 4B:
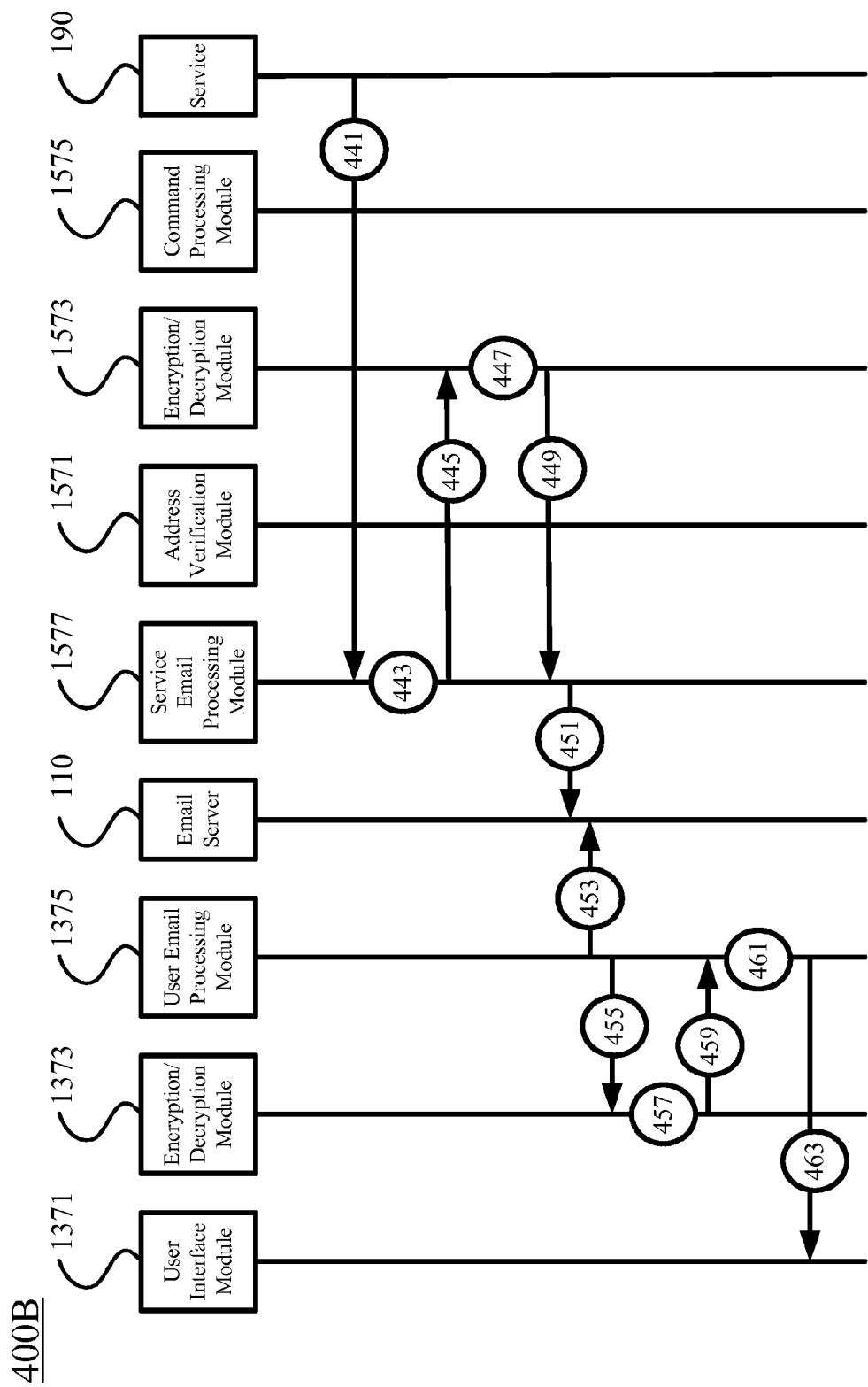
FIG. 4B schematically depicts a method of interacting with devices based on email according to certain embodiments of the present disclosure.

FIG. 4B schematically depicts a method of interacting with devices based on email according to certain embodiments of the present disclosure, where the result is, for example, whether the function is performed successfully or not. In certain embodiments, the method 400B as described in FIG. 4B may be implemented by the system 100 as shown in FIGS. 1A and 1B.

Referring to FIG. 4B, when the service 190 performs a function and generates a result, at operation 441, the service 190 sends the result to the service email processing module 1577.

Upon receiving the result from the service 190, at operation 443, the service email processing module 1577 generates a result email including the received result. When the result is the information whether the function is performed successfully or not, the generated result email may have the email identifier of the user that sent the command email. When the result is one or more commands, the generated result email may have the email identifier of another service located at another service device associated with the one or more commands.

Optionally, when the result email requires encryption, at operation 445, the device processing module 1577 sends the generated result email to the encryption/decryption module 1573. At operation 447, the encryption/decryption module 1573 performs encryption to the result email to form the encrypted result email. When encryption is completed, at operation 449, the encryption/decryption module 1573 sends the encrypted result email to the service email processing module 1577.

Once the result email is prepared and ready to be sent to the user device, at operation 451, the service email processing module 1577 sends the result email to the email server 110.

In certain embodiments, when the result email does not require encryption, the service email processing module 1577 may skip the operations 445-449 and directly perform the operation 451 to send the result email to the email server 110.

At the email server 110, the result email may be stored in the email server 110 until the user email application 137 retrieves the result email. Thus, the result in the result email may be preserved at the email server 110 regardless of the operational status of the user device 130 and/or the service device 150. For example, when an error occurs in the user device 130 such that the user device 130 is disconnected from the network 170, the result email may be preserved at the email server 110 without being under the risk of losing the result therein. Accordingly, the method provides a persistent communication way for the result to be delivered from the service device 150 to the user device 130, thus avoiding loss of results in a real time process.

At operation 453, the user email processing module 1375 retrieves the encrypted result email or the un-encrypted result email from the email server 110.

Optionally, when the result email is encrypted, at operation 455, the user email processing module 1375 sends the encrypted result email to the encryption/decryption module 1373 for decryption. At operation 457, the encryption/decryption module 1373 decrypts the result email to form the decrypted result email. When the decryption is completed, at operation 459, the decrypted result email is sent to the user email processing module 1375 or optionally to the user interface module 1371.

At operation 461, the user email processing module 1375 retrieve the result from the decrypted result email.

At operation 463, the user email processing module 1375 sends the retrieved result to the user interface module 1371, such that the result is viewable by the user through the user interface of the user interface module 1371. Optionally, the user email processing module may skip the operation 461, and send the result email to the user interface module 1371, such that the result email is viewable by the user through the user interface, In certain embodiments, when the result email retrieved by the user email processing module 1375 is not encrypted, the user email processing module 1375 may retrieve the result from the un-encrypted result email and send the result to the user interface module 1371, or send the un-encrypted result email directly to the user interface module 1371, such that the result email is viewable by the user through the user interface.

In certain embodiments, if the result email includes at least one second command associated with a second service, the result email may also be sent to a second service device that has the second service. The second service device may have the similar service email application, and configured to perform a corresponding second function based on the at least one second command extracted from the result email. The operations of the above function in the second service device may be similar to the operations 415 to 433 as described above and shown in FIG. 4.

Figure 5:
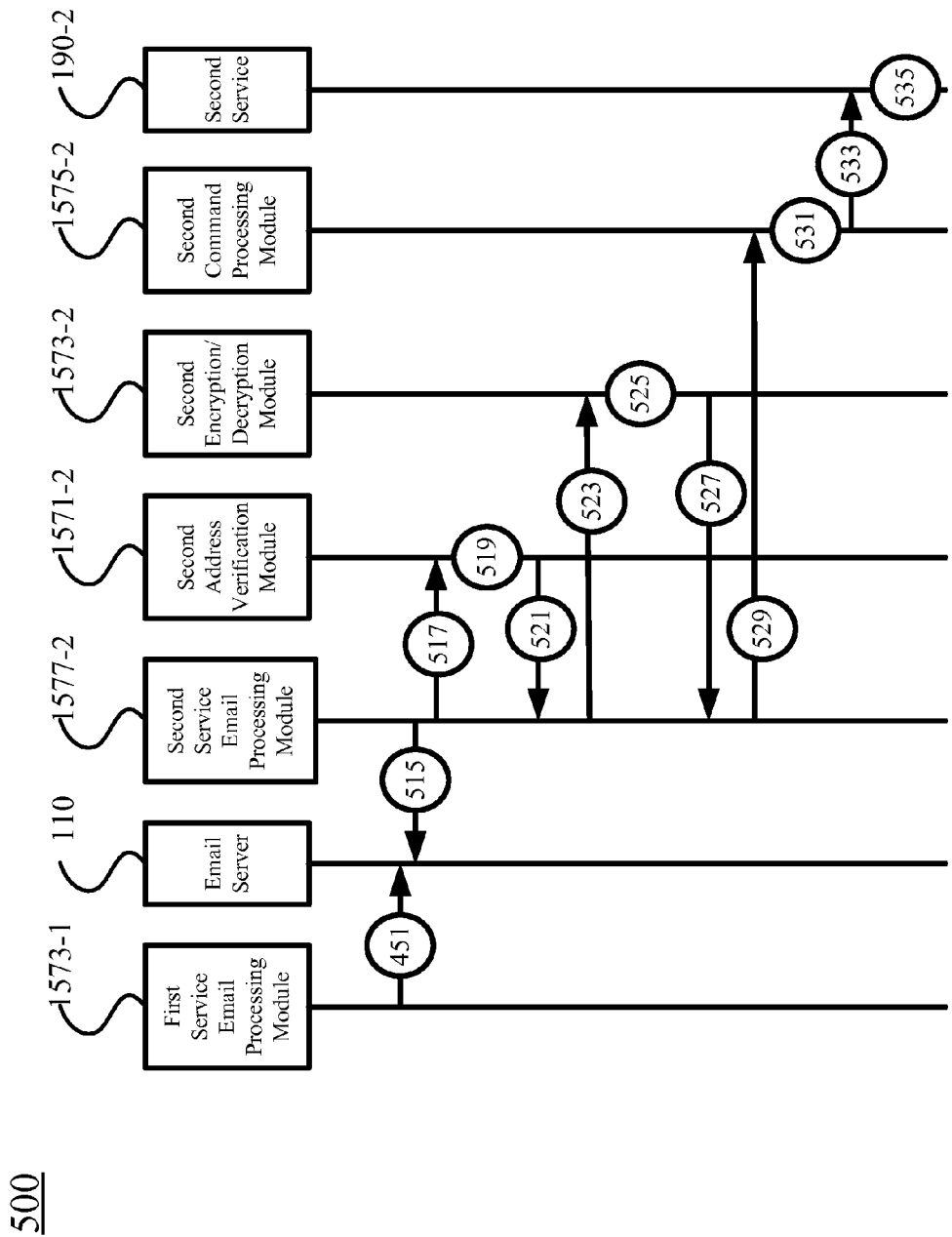
FIG. 5 schematically depicts a method of interacting with devices based on email according to certain embodiments of the present disclosure.

FIG. 5 schematically depicts a method of interacting with devices based on email according to certain embodiments of the present disclosure, where the result is, for example, at least one second command.

In certain embodiments, the method 500 as described in FIG. 5 may be implemented by the system 100 as shown in FIGS. 1A and 1B, with at least a first service device 150-1 and a second service device 150-2. The first service device 150-1 has a first email processing application 157-1 and a first service 190-1. The second service device 150-2 has a second email processing application 157-2 and a second service 190-2. The first email processing application 157-1 has a first address verification module 1571-1, a first encryption/decryption module 1573-1, a first command processing module 1575-1, and a first service email processing module 1577-1. The second email processing application 157-2 has a second address verification module 1571-2, a second encryption/decryption module 1573-2, a second command processing module 1575-2, and a second service email processing module 1577-2.

At operation 451 as shown in FIG. 4B, the first service email processing module 1573-1 sends the result email having at least one second command to the email server 110.

At operation 515, the second service email processing module 1577-2 of the second service email application 157-2 of the second service device 150-2 retrieves the result email from the email server 110. In certain embodiments, both the first service email processing module 1573-1 and the second service email processing module 1573-2 may use the same email server 110. In certain embodiments, the first service email processing module 1573-1 may use one email server, the second service email processing module 1573-2 may use another email server, and the two email servers may be in communication directly or indirectly through one or more other email servers in the network 170.

At operation 517, the second service email processing module 1577-2 sends the retrieved result email to the second address verification module 1571-2 for verification.

At operation 519, the second address verification module 1571-2 performs verification on the retrieved result email. In certain embodiment, the second address verification module 1571-2 may verify the retrieved result email based on the email identifier. For example, the second address verification module 1571-2 may verify if the email identifier is valid for further processing. In certain embodiments, the verification may include, but not limited to, comparing the email identifier of the retrieved result command email with an email identifier list, a file having the list, or a database having the email identifier list. The valid email identifier may include email addresses of certain users. In other embodiments, the valid email identifier may include email addresses having the same domain name.

When the second address verification module 1571-2 determines that the retrieved result command email is a valid command email, at operation 521, the second address verification module 1571-2 sends the verified result email to the second service email processing module 1577-2 for further processing. When the second address verification module 1571-2 determines that the retrieved result email is not a valid result email, the second address verification module 1571-2 may perform corresponding caution operation to the invalid email, such as discarding the invalid email.

Optionally, when the retrieved result email is encrypted, at operation 523, the second service email processing module 1577-2 sends the result email to the second encryption/decryption module 1573-2 for decryption. At operation 525, the second encryption/decryption module 1573-2 then decrypts the result email to form a decrypted result email. At operation 527, the second encryption/decryption module 1573-2 sends the decrypted result email to the second service email processing module 1577-2.

Upon receiving the decrypted result email, at operation 529, the second service email processing module 1577-2 sends the decrypted result email to the second command processing module 1575-2.

In certain embodiments, if the verified result email is not encrypted, the service email processing module 1577-2 may skip the operations 523-527 and sends the verified email to the second command processing module 1575-2 directly. In certain embodiments, the second service email processing module 1577-2 may perform operation 523 to send the verified result email to the encryption/decryption module 1573-2 regardless of whether the result email is encrypted or not. In this case, if the second encryption/decryption module 1573-2 receives an un-encrypted result email, the second encryption/decryption module 1573-2 does nothing at operation 525 to the result email, and performs operation 527 to send the un-encrypted result email to the second service email processing module 1577-2 or optionally to the second command processing module 1575-2.

When the second command processing module 1575-2 receives the decrypted result email, at operation 531, the second command processing module 1575-2 extracts the at least one second command from the result email. The at least one second command may be associated with at least one second service 190-2.

At operation 533, the second command processing module 1575-2 sends the extracted at least one second command to the second service 190-2.

At operation 535, the corresponding second service 190-2 then performs a second function based on the extracted at least one second command.

In certain embodiments, the second service 190-2 performing the second function generates a second result based on the performance of the second function. In certain embodiments, the second result may include information of whether the second function is performed successfully or not. In certain embodiments, the second result may include one or more third commands associated with a third service of a third service device.

In a further aspect, the present disclosure is related to a non-transitory computer readable medium storing computer executable code. The code, when executed at one or more processor of a service device 150 or/and a user device 130, may perform the method as described above. In certain embodiments, the non-transitory computer readable medium may include, but not limited to, the storage device 155 as described above, or any other storage media of the service device 150.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
a first service device and a second service device, each comprising one or more processors and a service email application, the first service device having at least one first service, the second service device having at least one second service,
wherein the service email application of the first service device, when executed at the one or more processors of the first service device, is configured to:
retrieve a command email from at least one email server via a network, wherein the command email comprises at least one first command and has an email identifier associated with the at least one first service;
extract the at least one first command from the command email;
send the extracted first command to the at least one first service such that the at least one first service performs a corresponding first function based on the extracted first command;
receive a result from the at least one service performing the first function;
generate a result email comprising the result, wherein the result comprises at least one second command, and the result email is subject to be sent to the second service device; and
send the result email to the at least one email server;
wherein the service email application of the second service device, when executed at the one or more processors of the second service device, is configured to:
retrieve the result email generated by the service email application of the first service device from the at least one email server;
extract the at least one second command from the result email; and
send the extracted second command to the at least one second service such that the at least one second service performs a corresponding second function based on the extracted second command,
wherein the service email application of the first service device, when executed, is further configured to:
verify the command email based on the email identifier of the command email;
decrypt the command email; and
encrypt the result email, and
wherein the service email application of the first service device comprises:
an address verification module, configured to verify the command email based on the email identifier of the command email;
an encryption/decryption module, configured to encrypt the result email and decrypt the command email;
a command processing module, configured to extract the at least one first command from the command email and send the extracted first command to the at least one first service such that the at least one first service performs the corresponding first function based on the extracted first command; and
a service email processing module, configured to retrieve the command email, receive the result, generate the result email, and send the encrypted result email.

2. The system of claim 1, further comprising:
at least one user device, each user device comprising one or more processors and a user email application, wherein the user email application, when executed at the one or more processors of the user device, is configured to:
provide a user interface configured to receive the at least one command;
prepare the command email;
encrypt the command email;
send the command email;
retrieve the encrypted result email;
decrypt the encrypted result email to form a decrypted result email; and
retrieve the result from the decrypted result email.

3. The system of claim 2, wherein the user email application comprises:
a user interface module, configured to provide the user interface;
an encryption/decryption module, configured to encrypt the command email and decrypt the encrypted result email; and
a user email processing module, configured to prepare the command email, send the command email, retrieve the encrypted result email, and retrieve the result from the decrypted result email.

4. The system of claim 1, wherein the at least one first service comprises management of IPMI, or management of combined SNMP and shell functions.

5. A method of performing email based interaction in a system, the method comprising:
   retrieving, at a service email application executed at one or more processors of a first service device, a command email, wherein the command email comprises at least one first command and has an email identifier associated with at least one first service of the first service device;
   extracting, at the service email application of the first service device, the at least one first command from the command email;
   sending, by the service email application of the first service device, the extracted first command to the at least one first service such that the at least one first service performs a corresponding first function based on the extracted first command;
   receiving a result from the at least one first service of the first service device performing the first function;
   generating, by the service email application of the first service device, a result email comprising the result, wherein the result comprises at least one second command, and the result email is subject to be sent to a second service device having at least one second service;
   sending the result email to at least one email server;
   retrieving, at a service email application executed at one or more processors of the second service device, the result email generated by the service email application of the first service device;
   extracting, at the service email application of the second service device, the at least one second command from the result email;
   sending, by the service email application of the second service device, the extracted second command to the at least one second service, such that the at least one second service performs a corresponding second function based on the extracted second command;
   verifying, at the service email application of the first service device, the command email based on the email identifier of the command email;
   decrypting the command email; and
   encrypting the result email,
   wherein the service email application of the first service device comprises:
   an address verification module, configured to verify the command email based on the email identifier of the command email;
   an encryption/decryption module, configured to encrypt the result email and decrypt the command email;
   a command processing module, configured to extract the at least one first command from the command email and send the extracted first command to the at least one first service such that the at least one first service performs the corresponding first function based on the extracted first command; and
   a service email processing module, configured to retrieve the command email, receive the result, generate the result email and send the encrypted result email.

6. The method of claim 5, wherein the system further comprises at least one user device, each user device comprising one or more processors and a user email application, wherein the user email application, when executed at the one or more processors of the user device, is configured to:
   provide a user interface configured to receive the at least one command;
   prepare the command email;
   encrypt the command email;
   send the command email;
   retrieve the encrypted result email
   decrypt the encrypted result email to form a decrypted result email; and
   retrieve the result from the decrypted result email.

7. The method of claim 6, wherein the user email application comprises:
   a user interface module, configured to provide the user interface;
   an encryption/decryption module, configured to encrypt the command email and decrypt the encrypted result email; and
   a user email processing module, configured to prepare the command email, send the command email, retrieve the encrypted result email, and retrieve the result from the decrypted result email.

8. A non-transitory computer readable medium storing computer executable code, wherein the code, when executed at one or more processors of a first service device, is configured to:
   retrieve a command email, wherein the command email comprises at least one first command and has an email identifier associated with at least one first service of the first service device;
   extract the at least one command from the command email;
   send the extracted first command to the at least one first service such that the at least one first service performs a corresponding first function based on the extracted first command;
   receive a result from the at least one first service performing the first function;
   generate a result email comprising the result, wherein the result comprises at least one second command, and the result email is subject to be sent to a second service device having at least one second service;
   send the result email to at least one email server;
   wherein the second service device is configured to retrieve the result email generated by a service email application of the first service device, extract the at least one second command from the result email, and send the extracted second command to the at least one second service, such that the at least one second service performs a corresponding second function based on the extracted second command,
   wherein the code, when executed at the one or more processors of the first service device, is further configured to:
   verify the command email based on the email identifier of the command email;
   decrypt the command email; and
   encrypt the result email, and
   wherein the code comprises:
   an address verification module, configured to verify the command email based on the email identifier of the command email;
   an encryption/decryption module, configured to encrypt the result email and decrypt the command email;
   a command processing module, configured to extract the at least one first command from the command email and send the extracted first command to the at least one first service such that the at least one first service performs the corresponding first function based on the extracted command; and a service email processing module, configured to retrieve the command email, receive the result, generate the result email and send the encrypted result email.

9. The non-transitory computer readable medium of claim 8, wherein the first service device is remotely connected to at least one user device through a network, each user device comprising one or more processors and a user email application, wherein the user email application, when executed at the one or more processors of the user device, is configured to:

provide a user interface configured to receive the at least one command;

prepare the command email;

encrypt the command email;

send the command email;

retrieve the encrypted result email;

decrypt the encrypted result email to form a decrypted result email; and retrieve the result from the decrypted result email.

10. The non-transitory computer readable medium of claim 9, wherein the user email application comprises:

a user interface module, configure to provide the user interface;

an encryption/decryption module, configured to encrypt the command email and decrypt the encrypted result email; and a user email processing module, configured to prepare the command email, send the command email, retrieve the encrypted result email, and retrieve the result from the decrypted result email.

* * * * *